US012411753B2

(12) United States Patent
Haile

(10) Patent No.: US 12,411,753 B2
(45) Date of Patent: Sep. 9, 2025

(54) BRANCHING DATA MONITORING WATCHPOINTS TO ENABLE CONTINUOUS INTEGRATION AND CONTINUOUS DELIVERY OF DATA

(71) Applicant: Data Culpa, Inc., Carlisle, MA (US)

(72) Inventor: J. Mitchell Haile, Carlisle, MA (US)

(73) Assignee: Data Culpa, Inc., Carlisle, MA (US)

( * ) Notice: Subject to any disclaimer, the term of this patent is extended or adjusted under 35 U.S.C. 154(b) by 183 days.

(21) Appl. No.: 18/302,991

(22) Filed: Apr. 19, 2023

(65) Prior Publication Data

US 2023/0342281 A1 Oct. 26, 2023

Related U.S. Application Data

(60) Provisional application No. 63/333,242, filed on Apr. 21, 2022.

(51) Int. Cl.
*G06F 11/3604* (2025.01)
*G06F 11/3668* (2025.01)

(52) U.S. Cl.
CPC ...... *G06F 11/3608* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 9,892,020 B1* | 2/2018 | Ophir | G06F 16/24568 |
| 10,747,651 B1* | 8/2020 | Vanderwall | G06F 11/3684 |
| 10,860,466 B1* | 12/2020 | Baldwin | G06F 11/3688 |
| 12,158,831 B2* | 12/2024 | Wan | G06F 11/302 |
| 2019/0080016 A1* | 3/2019 | Avihail | H04L 69/16 |
| 2022/0365973 A1* | 11/2022 | Kabra | G06N 3/08 |
| 2023/0130027 A1* | 4/2023 | Mason | G06F 11/3692 717/124 |

OTHER PUBLICATIONS

Lazovik, "Runtime modification of Spark data processing pipelines", 2017, IEEE (Year: 2017).*

* cited by examiner

*Primary Examiner* — Hossain M Morshed

(57) ABSTRACT

Various embodiments comprise systems and methods for operating a data monitoring system to branch data models. In some examples, a data monitoring system maintains a series of models for a data stream. The data monitoring system adds a reference pointer to a position in the series of models. The data monitoring system generates a set of branch models for the data stream and appends the set of branch models to the series of models at the reference pointer. The data monitoring system compares ones of the set of branch models with corresponding ones of the series of models and generates test results based on the comparison. The data monitoring system reports the test results.

20 Claims, 8 Drawing Sheets

US 12,411,753 B2

BRANCHING DATA MONITORING WATCHPOINTS TO ENABLE CONTINUOUS INTEGRATION AND CONTINUOUS DELIVERY OF DATA

RELATED APPLICATIONS

This U.S. Patent Application claims priority to U.S. Provisional Patent Application 63/333,242 entitled "BRANCHING DATA MONITORING WATCHPOINTS TO ENABLE CONTINUOUS INTEGRATION AND CONTINUOUS DELIVERY OF DATA" which was filed on Apr. 21, 2022, and which is incorporated by reference into this U.S. Patent Application in its entirety.

TECHNICAL BACKGROUND

A data pipeline comprises a series of data processing elements that intake data from a data source, process the input data for a desired effect, and transfer the processed data to a data target. Data pipelines are configured to intake data that comprises a known format for their data processing elements to operate accurately. When the input data to a data pipeline is altered, the data processing elements may not recognize the changes which can cause malfunctions in the operation of the data pipeline. Changes to input data often arise when the data sets are large which results in a variety of technical issues exist when processing or ingesting data received through a data pipeline. Implicit schema and schema creep like typos or changes to schema often cause issues when ingesting data. Completeness issues can also arise when ingesting data. For example, completeness can be compromised when there is an incorrect count of data rows/documents, there are missing fields or missing values, and/or there are duplicate and near-duplicate data entries. Additionally, accuracy issues may arise when there are incorrect types in fields. For example, a string field that often comprises numbers is altered to now comprise words. Accuracy issues may further arise when there are incorrect category field values and incorrect continuous field values. For example, a continuous field may usually have distribution between 0 and 100, but the distribution is significantly different on updated rows or out of our usual bounds. Data pipelines may have bugs which impact data quality and data pipeline code is difficult to debug.

Data pipeline monitoring systems are employed to counteract the range of technical issues that occur with data pipelines and determine when problems arise. Traditional data pipeline monitoring systems employ a user defined ruleset that governs what inputs and outputs for a data pipeline should look like. When data monitoring systems detect inputs and/or outputs of the pipeline are malformed, the monitoring system alerts pipeline operators that an issue has occurred.

In order to combat the technical issues that affect data pipelines, data pipeline operators introduce code fixes to the data pipeline. However, data pipelines are hugely complex systems. It is often difficult or impossible to accurately identify what changes need to be made to the data pipeline to correct a technical issue. Moreover, it is difficult to predict how a code change will affect a data pipeline, whether the code change will successfully resolve the issue, and/or if other technical issues will arise with the code change. Unfortunately, data pipeline monitoring systems do not effectively model code changes in data pipelines. Moreover, data pipeline monitoring systems do not efficiently track when code changes to a data pipeline are successful or unsuccessful.

OVERVIEW

This Overview is provided to introduce a selection of concepts in a simplified form that are further described below in the Detail Description. This summary is not intended to identify key features or essential features of the claimed subject matter, nor is it intended to be used as an aid in determining the scope of the claimed subject matter.

Various embodiments of the present technology generally relate to solutions for branching watchpoints in a data monitoring system. Some embodiments comprise a data monitoring system to branch data models. The data monitoring system comprises a memory that stores executable components and a processor operatively coupled to the memory that executes the executable components. The executable components comprise a monitoring component. The monitoring component maintains a series of models for a data stream. The data monitoring system adds a reference pointer to a position in the series of models. The data monitoring system generates a set of branch models for the data stream and appends the set of branch models to the series of models at the reference pointer. The data monitoring system compares ones of the set of branch models with corresponding ones of the series of models and generates test results based on the comparison. The data monitoring system reports the test results.

Some embodiments comprise a method of operating a data monitoring system to branch data models. The method comprises maintaining a series of models for a data stream. The method further comprises adding a reference pointer to a position in the series of models. The method further comprises generating a set of branch models for the data stream and appending the set of branch models to the series of models at the reference pointer. The method further comprises comparing ones of the set of branch models with corresponding ones of the series of models and generating test results based on the comparison. The method further comprises reporting the test results.

Some embodiments comprise a non-transitory computer-readable medium storing instructions to branch data models. The instructions, in response to execution by one or more processors, cause the one or more processors to drive a system to perform data monitoring operations. The operations comprise maintaining a series of models for a data stream. The operations further comprise adding a reference pointer to a position in the series of models. The operations further comprise generating a set of branch models for the data stream and appending the set of branch models to the series of models at the reference pointer. The operations further comprise comparing ones of the set of branch models with corresponding ones of the series of models and generating test results based on the comparison. The operations further comprise reporting the test results.

DESCRIPTION OF THE DRAWINGS

Many aspects of the disclosure can be better understood with reference to the following drawings. The components in the drawings are not necessarily drawn to sale. Moreover, in the drawings, like reference numerals designate corresponding parts throughout the several views. While several embodiments are described in connection with these drawings, the disclosure is not limited to the embodiments

Figure 1:
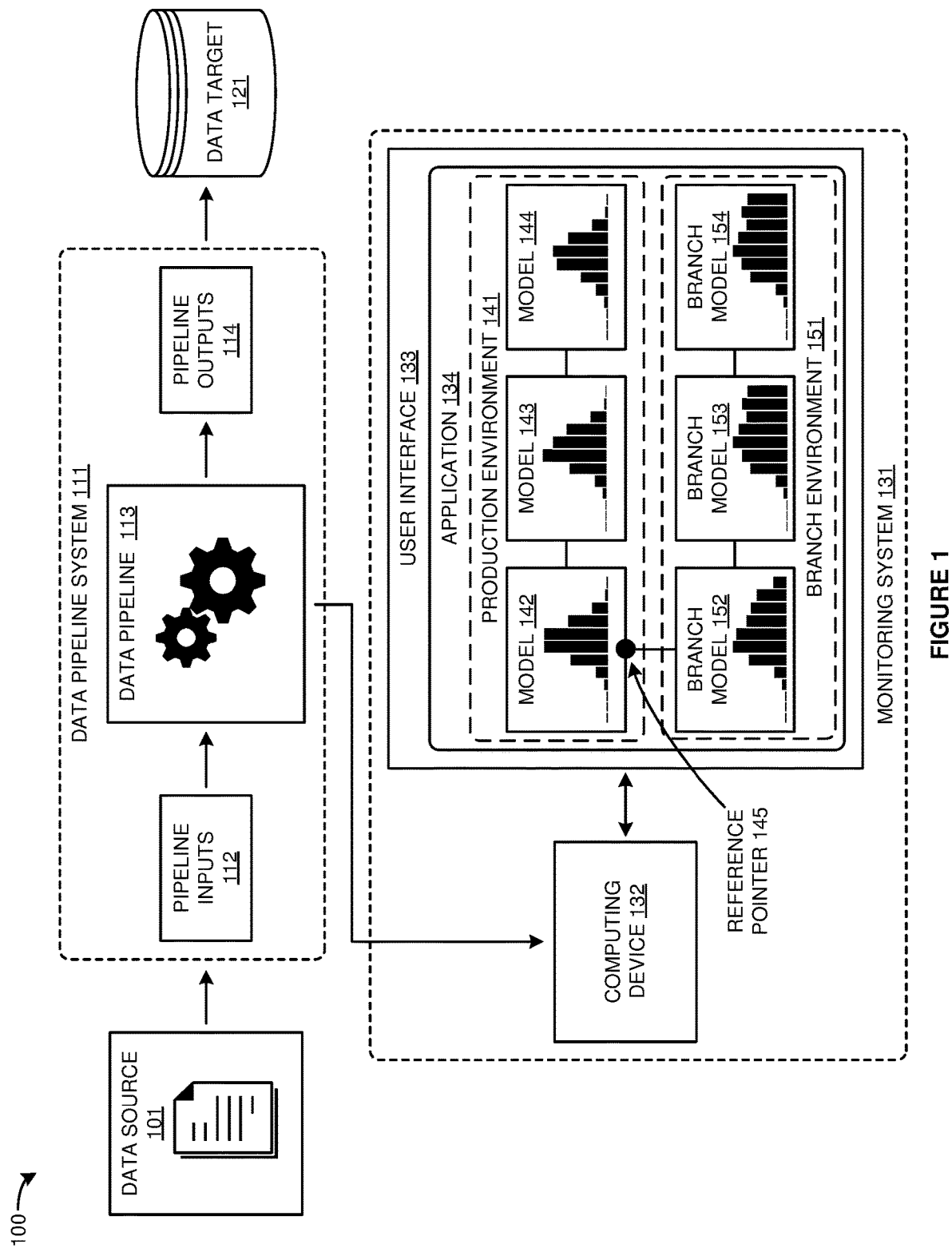
FIG. 1 illustrates an exemplary data processing environment.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Data pipelines comprise a set of computing devices aligned in series. The computing devices extract data from a data source, process the extracted data into a consumable form, and load the processed data to a target destination. The data processing may comprise a data cleaning process that enforces data output standards on the processed data. For example, the data pipeline may enforce data type filters on the extracted data to conform with output data standards. Data pipelines can be large and complex systems. Due to the size and complexity of data pipelines, making changes like bug fixes and code updates to the pipeline software is correspondingly difficult. Specifically, it is difficult to predict how software updates to a data pipeline affect the outputs generated by the data pipeline.

Various embodiments of the present technology relate to solutions for modeling data sets. More specifically, embodiments of the present technology relate to systems and methods for branching data monitoring watchpoints to enable continuous integration and continuous delivery of data. In some examples, a data pipeline monitoring system is operatively coupled to a data pipeline. The data pipeline monitoring system comprises one or more computing devices configured to model the operations of the data pipeline to inform pipeline operators of the status of the pipeline. The monitoring system ingests outputs of the data pipeline and models the output data sets to depict the operations of the data pipeline. The monitoring systems may determine data set attributes like volume, schema, types, values, and the like to model the outputs. When a pipeline operator makes a proposed code change (referred to as a branch) to the data pipeline, the data pipeline notifies the data pipeline monitoring system. The data pipeline monitoring system ingests pipeline outputs generated using the branched pipeline code and models the output attributes to depict the branched operations of the data pipeline. The data pipeline monitoring system compares the branched model to the production model of the data pipeline to assess the effects of the code change on the data pipeline operations. For example, the data pipeline monitoring system may compare the models to determine if the branched model is congruent with the production model and/or if the branched model comprise expected attributes introduced by the code change. The effective modeling of branched pipeline outputs allows pipeline operators to assess the effects of the code changes. The branched view of the data pipeline further allows pipeline operators to efficiently and effectively code branches into the production environment of the data pipeline and avoid integrating ineffective code branches into the data pipeline.

Now referring to the Figures. FIG. 1 illustrates data processing environment 100 to branch data models. Data processing environment 100 processes raw data generated by data sources into a processed form for use in data analytics, data enrichment, data storage, data harvesting, and the like. Data processing environment 100 comprises data source 101, data pipeline system 111, data target 121, and monitoring system 131. In other examples, data processing environment 100 may include fewer or additional components than those illustrated in FIG. 1. Likewise, the illustrated components of data processing environment 100 may include fewer or additional components, assets, or connections than shown. Each of data source 101, data pipeline system 111, data target 121, and/or monitoring system 131 may be representative of a single computing apparatus or multiple computing apparatuses.

Data source 101 is operatively coupled to data pipeline system 111 and is representative of one or more systems, apparatuses, devices, and the like that generate raw data for consumption by data pipeline system 111. Data source 101 may comprise a computing device of an industrial system, a financial system, research system, or some other type of system configured to generate data. For example, data source 101 may comprise a computer affiliated with a banking service that generates account event data for user accounts. It should be appreciated that the type of data generated by data source 101 is not limited.

Data pipeline system 111 is operatively coupled to source 101, data target 121, and monitoring system 131. Data pipeline system 111 is representative of a data processing environment which intakes "raw" or otherwise unprocessed data from data source 101 and emits processed data configured for consumption by an end user. Data pipeline system 111 comprises pipeline inputs 112, data pipeline 113, and pipeline outputs 114. Pipeline inputs 112 comprise unprocessed data generated by data source 101. Pipeline outputs 114 comprise processed data generated by the operation of data pipeline 113. Data pipeline 113 comprises one or more computing devices that are connected in series that intake pipeline inputs 112 received from data source 101 and generate pipeline outputs 114. The one or more computing devices that comprise data pipeline 113 may execute applications to clean, enrich, link, transform, or perform some other operation on pipeline inputs 112 to form pipeline outputs 114. For example, the computing devices of data pipeline 113 may ingest pipeline inputs 112 and execute transform functions on pipeline inputs 112. The execution of the transform functions alters pipeline inputs 112 into a consumable form to generate pipeline outputs 114. For example, pipeline inputs 112 may comprise a non-standard data format. The execution of the transform functions may filter the data types of pipeline inputs 112 to generate pipeline outputs 114 which can then be loaded into a database of data target 121.

Data target 121 is operatively coupled to data pipeline system 111. Data target 121 is representative of a destination for pipeline outputs 114 generated by data pipeline 113. Data target 121 may comprise of one or more computing systems comprising memory that receive and store pipeline outputs 114 generated by data pipeline 113. For example, data target 121 may comprise a database, data structure, data repository, data lake, another data pipeline, and/or some other type of data storage system. In other examples, data target 121 may represent another type of computing device. In some examples, data pipeline system 111 loads pipeline outputs 114 onto data target 121 for storage.

Monitoring system 131 is operatively coupled to data pipeline system 111. Monitoring system 131 is representative of one or more computing systems configured to monitor the operation of data pipeline system 111 and/or data target 121. Monitoring system 131 comprises computing device 132 and user interface 133. Computing device 132 comprises one or more computing apparatuses configured to host application(s) 134 to monitor the operation of data pipeline system 111. It should be appreciated that the specific number of applications/modules hosted by computing device 132 is not limited. Exemplary applications hosted by computing device 132 to branch data models and/or to test code changes in data pipeline system 111 include Data Culpa Validator and the like. Computing device 132 is coupled to user interface 133. User interface 133 comprises a display, keyboard, touchscreen, tablet, and/or some other type of user interface device. User interface 133 displays application 134 and allows a user to interact with the application 134 hosted by computing device 132 to monitor the operation of data pipeline system 111 and/or data target 121.

Application 134 comprises production environment 141 and branch environment 151. Production environment 141 is representative of one or more application modules configured to monitor data streams copied to computing device 132 from data pipeline 113. Production environment 141 comprises models 142-144 which model data streams of data pipeline 113. Models 142-144 may correspond to dates of operations for data pipeline system 113. For example, model 142 may correspond to the first date of operations for data pipeline 113, model 143 may correspond to a second date of operations for data pipeline 113, and model 144 may correspond to a third date of operations for data pipeline 113. In other examples, models 142-144 may correspond to different data streams generated by data pipeline 113. For example, model 142 may correspond to a first data stream of a first computing device of data pipeline 113, model 143 may correspond to a second data stream of a second computing device of data pipeline 113, and model 144 may correspond to a third data stream of a third computing device of data pipeline 113. Models 142-144 may monitor the shape, volume, value ranges, schemas, statistical attributes, data types, and/or other qualities of the data streams of data pipeline 113 to monitor the operation of data pipeline 113. Models 142-144 are often referred to as watchpoints as they allow a user to view and monitor a data stream. Models 142-144 may be monitoring a table in a data storage environment or records in data pipeline 113 or data target 121 that are being copied to application 134 to monitor. Production environment 141 is displayed on user interface 133 and allows a user to view models 142-144 to assess the operating state of data pipeline 113.

Application 134 comprises branch environment 151. Application 134 allows a user to "branch" their watchpoint. This allows a user to pick a specific point in time to assign a new name and for application 134 to compute the new data against the pre-branched data that is already modeled in production environment 141 to determine if the new data is cohesive with the previously modeled data or differs from the previously modeled data. The point in time is not limited. For example, a user may generate a branched model from archived data in the past. Branch environment 151 is representative of one or more application modules configured to monitor branched data streams copied to computing device 132. For example, a pipeline operator may introduce a proposed code change to data pipeline 113 and may wish to test how the proposed code change will affect the operation of data pipeline 113. In response, application 134 may generate branch environment 151 and append branch environment 151 to production environment 141 via reference pointer 145. In some examples, application 134 may generate branch environment to test different modeling techniques without a code change in data pipeline 113. For example, branch environment 151 may comprise a new error threshold and application 134 may generate branch models 152-154 using the same data stream as production environment 141 to test the new error threshold.

Reference pointer 145 is added to production environment 141 and corresponds to where or when the code change takes place within data pipeline 113 or may comprise an operator selected point in time. Typically, reference pointer 145 indicates that code change only impacts models after the reference pointer. For example, if the code change in data pipeline 113 is made on a specific date of operations, reference pointer 145 is added to a model that corresponds to that date. In other examples, the code change in data pipeline 113 may correspond to a specific data stream. For example, the code change may affect a second data stream in a series of data streams and reference pointer 145 is added to a model that corresponds to the second data stream. This may indicate that a first data stream of pipeline 113 will not be affected by the code change while the second data stream and subsequent streams after the second may be affected.

Application 134 receives test data streams from data pipeline 113 and generates branch models 152-154 to model the data and determine the effect of the proposed code change. Branch models 152-154 may monitor the shape, volume, value ranges, schemas, statistical attributes, and/or other qualities of the test data streams of data pipeline 113 to identify the effects of the code change. Since branch environment 151 is appended to production environment 141 by reference pointer 145 at a position after the code change, a user may directly compare the models of existing data streams with models of the branched data streams. For example, model 143 and branch model 152 may correspond to a date of operations of data pipeline 113. Model 143 may represent the data stream generated on that date using in-production code while branch model 152 may represent the data stream generated on that date using branched code. A user may then compare model 143 to model 152 to determine if the models 143 and 152 are congruent and/or if model 152 is exhibiting expected behavior. Data pipeline 113 may transfer metadata to application 134 that characterizes the expected behavior of branch models 152-154. The metadata may comprise expected schemas, value ranges, data volumes, data types, field names, and the like. Advantageously, monitoring system 131 effectively and effectively branches data models associated with data pipeline 113.

Data source 101, Data pipeline system 111, data target 121, and monitoring system 131 comprise microprocessors, software, memories, transceivers, bus circuitry, and the like. The microprocessors comprise Central Processing Units (CPU), Graphical Processing Units (GPU), Application-Specific Integrated Circuits (ASIC), Field Programmable Gate Array (FPGA), and/or types of processing circuitry. The memories comprise Random Access Memory (RAM), flash circuitry, disk drives, and/or the like. The memories store software like operating systems, user applications, data analysis applications, and data processing functions. The microprocessors retrieve the software from the memories and execute the software to drive the operation of data processing environment 100 as described herein. The communication links that support connect the elements of data processing system use metallic links, glass fibers, radio channels, or some other communication media. The communication links use Time Division Multiplex (TDM), Data Over Cable System Interface Specification (DOCSIS), Internet Protocol (IP), General Packet Radio Service Transfer Protocol (GTP), Institute of Electrical and Electron Engineers (IEEE) 802.11 (WIFI), IEEE 802.3 (ENET), virtual switching, inter-processor communication, bus interfaces, and/or some other data communication protocols. Data source 101, data pipeline system 111, data target 121, and monitoring system 131 may exist as unified computing devices and/or may be distributed between multiple computing devices across multiple geographic locations.

Figure 2:
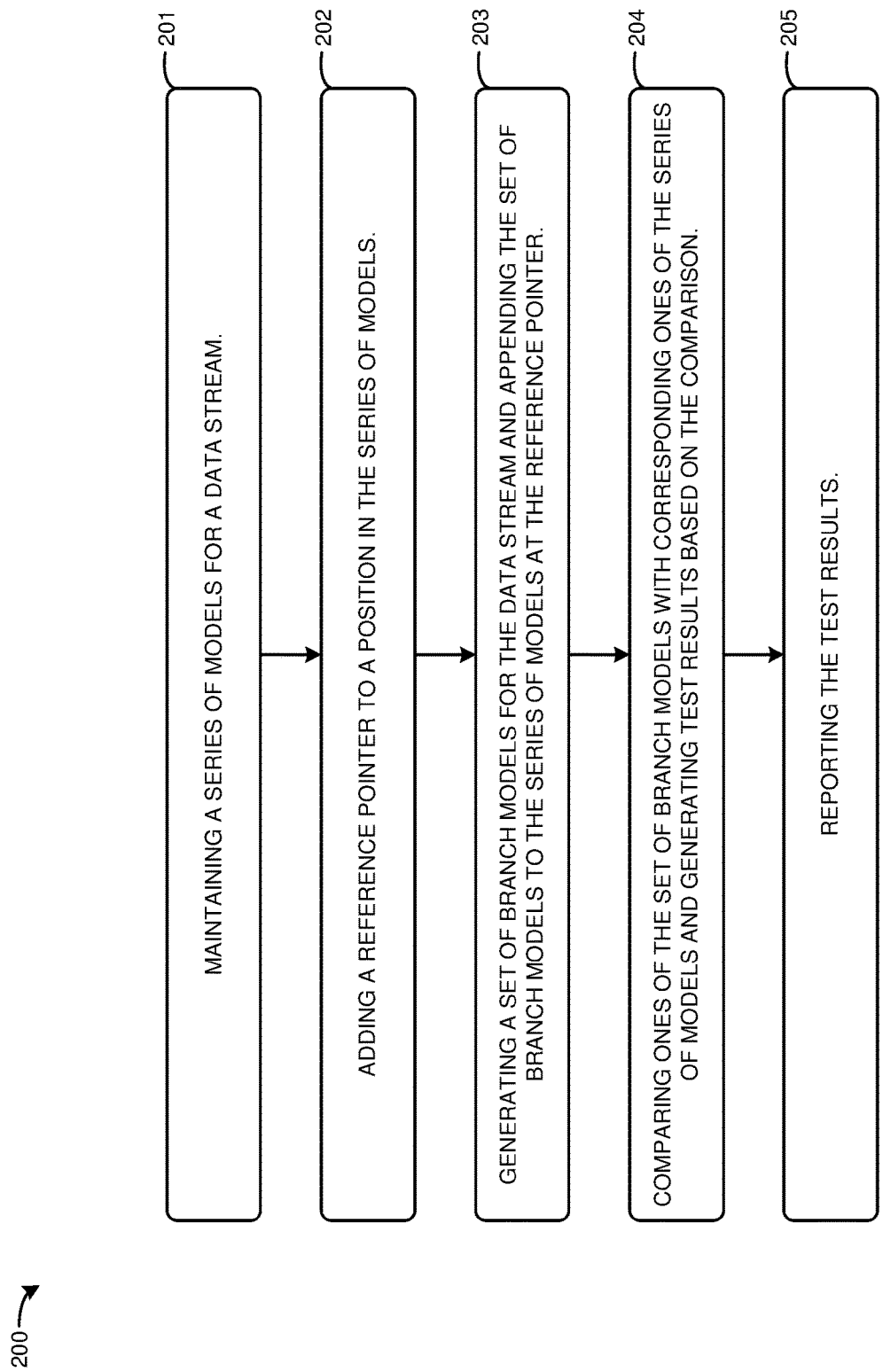
FIG. 2 illustrates an exemplary operation of the data processing environment.

In some examples, data processing environment 100 implements process 200 illustrated in FIG. 2. It should be appreciated that the structure and operation of data processing environment 100 may differ in other examples.

FIG. 2 illustrates process 200. Process 200 comprises a model branching process. Process 200 may be implemented in program instructions in the context of any of the software applications, module components, or other such elements of one or more computing devices. The program instructions direct the computing devices(s) to operate as follows, referred to in the singular for the sake of clarity.

The operations of process 200 comprise maintaining a series of models for a data stream (step 201). The operations further comprise adding a reference pointer to a position in the series of models (step 202). The operations further comprise generating a set of branch models for the data stream and appending the set of branch models to the series of models at the reference pointer (step 203). The operations further comprise comparing ones of the set of branch models with corresponding ones of the series of models and generating test results based on the comparison (step 204). The operations further comprise reporting the test results (step 205).

Referring back to FIG. 1, data processing environment 100 includes a brief example of process 200 as employed by one or more applications hosted by computing device 132, pipeline system 111, and data target 121. The operation may differ in other examples.

In operation, data pipeline 113 receives pipeline inputs 112 generated by data source 101. For example, data source 101 may comprise a manufacturing environment which generates production data and transfers the production data, machine operations data, or other types of industrial information to data pipeline system 111 as pipeline inputs 112. Data pipeline 113 processes pipeline inputs 112 and generates pipeline outputs 114. For example, data pipeline 113 may execute a series of data processing steps to transform pipeline inputs 112 into a standardized form configured for data target 121. Data pipeline 113 may comprise a series of data processing devices that generate data streams as they process pipeline inputs 112 into pipeline outputs 114. For example, a first one of the computing devices may ingest pipeline inputs 112 and generate an output data stream. A subsequent one of the computing devices may ingest the output data stream generated by the first one of the computing devices and generate its own output data stream. This process may continue to a final one of the computing devices which generates pipeline outputs 114. Data pipeline 113 may copy the data streams generated by each of its constituent computing devices to application 134 to model the data streams and characterize the operation of its constituent computing devices. As data pipeline 113 processes pipeline inputs 112, data pipeline 113 calls application 134 hosted by computing device 132 to ingest and model data outputs 114.

Application 134 receives the call from data pipeline 113 to model the output data stream. Application 134 may comprise an Application Programming Interface (API) to facilitate communication between itself and data pipeline 113. For example, data pipeline 113 may call the API of application 134 to model the output data stream. Application 134 receives the data stream and determines data attributes for the received data and generates models 142-144 based on the determined attributes. Application 134 generates models 142-144 chronologically. For example, application 134 may receive pipeline outputs 114 on the first date of operations and generate model 142. Subsequently, application 134 receives pipeline outputs 114 on a second data of operations and generates model 143 and so on. The data attributes comprise used to generate models 142-144 comprise data set shape, metadata, data volume, data value ranges, average data values, data schemas, data formats, data fields and/or other statistical attributes to quantitatively characterize the data streams. Application 134 presents models 142-144 in production environment 141 and displays production environment 141 on user interface 133. Each of models 142-144 may correspond to a date of operations of data pipeline 113 and are sequentially generated as time passes. It should be appreciated that the number of models is not limited. Application 134 maintains models 142-144 as watchpoints to model data streams produced by the computing devices of data pipeline 113 (step 201). Production environment 141 is displayed on user interface 133 to allow a user to monitor the operation of data pipeline 113 over time.

Subsequently, an operator creates an updated modeling scheme to model pipeline outputs 114. The operator may create a new data standard to detect when pipeline outputs 114 become malformed. For example, the new data standard may comprise reduced error detection tolerance, increased error detection tolerance, and/or some other type of modeling scheme that differs from production environment 141. Application 134 receives a user input that selects model 142 and that comprises the updated modeling scheme. In response to the user input, application 134 adds reference pointer 145 to model 142 (step 202). For example, the operator may select model 142 to test the updated modeling scheme on archived data outputs.

Application 134 retrieves archived pipeline outputs (e.g., from data target 121) that correspond to models 142-144. For example, application 134 may query data target 121 for pipeline outputs 114 that correspond to the generation dates of models 142-144. Application 134 processes the retrieved pipeline outputs using the updated data standard to determine the shape, metadata, data volume, data value ranges, data schemas, data formats, data fields, and/or other statistical attributes of the retrieved data. Application 134 responsively generates branch models 152-154 using the updated modeling scheme and attaches branched environment 151 to production environment 141 at the position indicated by reference pointer 145 (step 203). Application 134 compares branch models 152-154 to corresponding ones of models 142-144 to assess the updated modeling scheme and generates test results based on the comparison (step 204). For example, application 134 may generate and compare metadata for models 142-144 and branch models 152-154 to determine if the updated modeling scheme is satisfactory. Application 134 reports the test results to the operator (step 205). The test results may comprise pass or fail indicators for branch models 152-154.

In some examples, application 134 generates branch environment 151 in response to the creation of a code branch in data pipeline 113. For example, an operator may create a code branch in data pipeline 113. The operator may create the code branch to test out a proposed code change to data pipeline 113 before pushing the code change to production. Typically, developers work on the "main line" or "trunk" of the code of data pipeline 113 and may create a "branch" to isolate a change or do an experiment without impacting the mainline of data pipeline 113. A branch generally has a name or label and is tied to the trunk at a specific point in time. The branching and trunk jargon refer to a tree data structure—a directed graph. In many cases, there are two primary reasons an operator will make a code change to data pipeline 113. In the first case, data inputs 112 may have changed in some way and pipeline 113 needs to be updated to handle changes in data inputs 112. For example, a comma may have been changed to a semi-colon or numbers that were stored as kilograms but are now in ounces in data inputs 112. In the second case, an operator may wish to enhance the functionality of data pipeline 113 in some way. For example, the operator may wish to add data fields, make changes to handle time-zones, or perform some other type of enhancement. In the first case, monitoring system 131 may monitor data pipeline 113 to determine when the data inputs 112 have changed which caused the issue with data pipeline 113. In either case, an operator needs to verify that the code change to data pipeline 113 is effective and does not result in malformed data outputs generated by data pipeline 113.

In response to the creation of the code branch, data pipeline 113 calls application 134 to model test data streams associated with the branch. For example, data pipeline 113 may call an API of application 134. The call indicates the position and time within data pipeline 113 where the code change has occurred. In response, application 134 adds reference pointer 145 to production environment 141 at a model position where the code change occurred. For example, the code change may have been made on a given day of operations and application 134 may add reference pointer 145 to the model for that day of operations.

Data pipeline 113 transfers a branched data stream generated using the branched pipeline environment to application 134. Application 134 receives the branched data stream processes the branched data streams to model the branched data and responsively generates branch models 152-154. Application 134 may sequentially generate branch models 152-154 as time passes. Application 134 appends branched environment 151 to production environment 141 at the position indicated by reference pointer 145. In some examples, it is possible for application 134 to create branches off of existing branches appended to production environment 141. Application 134 compares branch models 152-154 against corresponding ones of models 142-144 to determine if the branched data stream aligns with production environment 141 or if an expected change has occurred in branch models 152-154. For example, the call from data pipeline 113 may comprise an expected change and application 134 may compute metadata for branch environment 151 to determine if the expected change occurred based on the qualities of branched models 152-154.

Application 134 generates test results based on the comparison that indicate whether the branch models 152-154 are cohesive with production environment 141 and/or if an expected change has occurred. For example, application 134 may generate and track metadata for branch models 152-154 to determine if expected behavior resulting from the code change has occurred. When the metadata is not congruent with expected behavior (e.g., expected data fields are not present), application 134 may generate and transfer an alert. Application 134 presents the test results via user interface 133 for review by the operator. The test results may indicate whether the code change in data pipeline 113 was successful. For example, the test results may indicate whether or not branched models 152-154 are congruent with corresponding ones of models 142-144. In some examples, application 134 may transfer the test results to another computing device for view may a user. For example, application 134 may send an email or text message comprising the test results for delivery to a mobile device of a user.

In some examples, application 134 receives metadata from data pipeline 134 that indicates the code change tested by branch environment 151 was implemented into the main production line of data pipeline 113. For example, a pipeline operator may review the test results, conclude that the code change was successful, and push the code change into production. Application 134 may track metadata for branch models 152-154 and determine if the metadata is associated with an expected change. When this change occurs in production environment 141, application 134 may access the metadata and mark the change as expected. In some examples, application 134 may remove branch environment 151 once the code has been pushed to production. Alternatively, application 134 may deactivate production environment 141 and maintain branch environment 151 as the new production model. In some examples, application 134 compares the code change and branch environment 151 with GitHub, or other change systems, branches, labels, or releases. In some examples, application 134 may incorporate branch models 152-154 into production environment 141. For example, application 134 may determine that the code change in data pipeline 113 has been pushed to production. The expected behavior modeled by branch models 152-154 now represents the behavior modeled in production environment 141. Models 142-144 may be updated to include data trends, data shapes, and the like modeled in branch environment 151.

Figure 3:
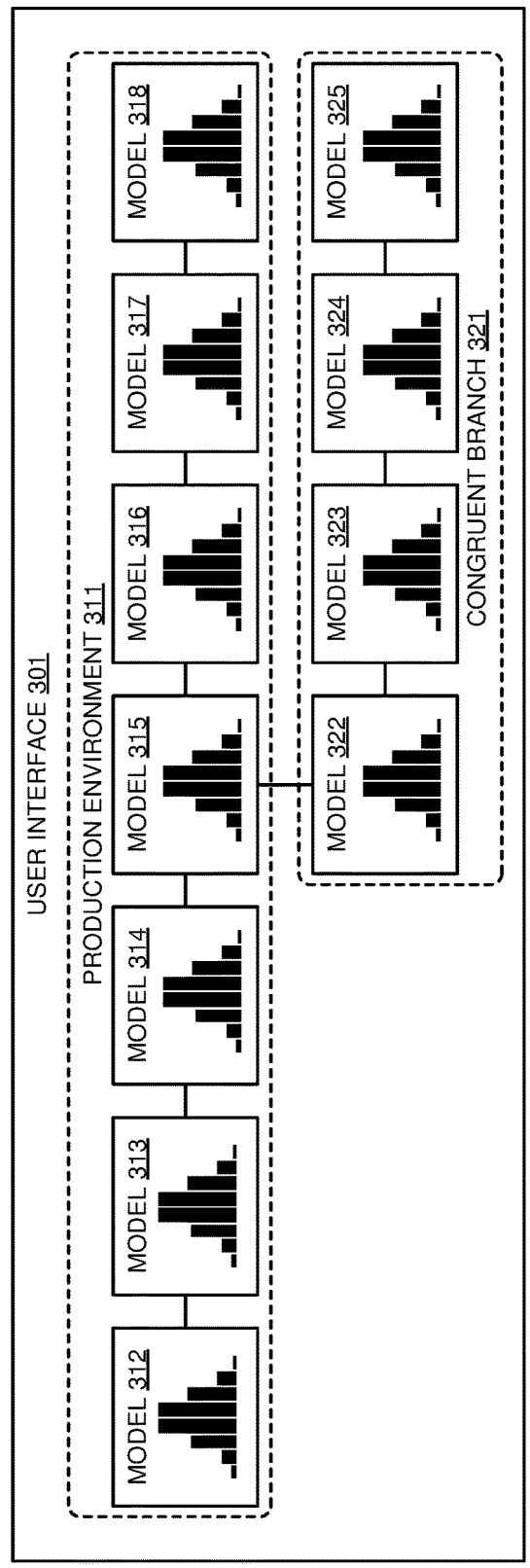
FIG. 3 illustrates an exemplary user interface.

FIG. 3 illustrates environment 300 which comprises user interface 301. User interface 301 is an example of user interface 133, although user interface 133 may differ. User interface 301 comprises production environment 311 and congruent branch 321. Production environment 311 comprises data stream models 312-318 and congruent branch 321 comprises branch data stream models 322-325. Congruent branch 321 is appended to production environment 311 at model 315. For example, a code change may have been made to the data stream of a data pipeline represented by model 315 or a user may wish to test an updated modeling scheme for models 315-318. In this example, the data streams represented by models 315-318 correspond to the branch data streams represented by models 322-325 respectively (i.e., model 315 corresponds to model 322 and so on). Additionally, models 322-325 of congruent branch 321 exceed a similarity threshold with corresponding ones of models 315-318. This indicates that the shape, volume, field, schemas, value ranges, and the like of branch models 322-325 are similar to corresponding ones of models 315-318. For example, the similarity threshold may comprise a minimum statistical distance (e.g., a geometric distance) between probability distributions for corresponding ones of data stream models 312-318 and branch data stream models 322-325. When the statistical distance between a branch model and a data stream model exceeds the similarity threshold, the branch model is considered congruent with the data stream model.

In other examples, user interface 301 may comprise additional features not illustrated in FIG. 3 like options to view test results, options to create branches, options to search for data models, and the like. However, these additional options have been omitted for the sake of clarity.

Figure 4:
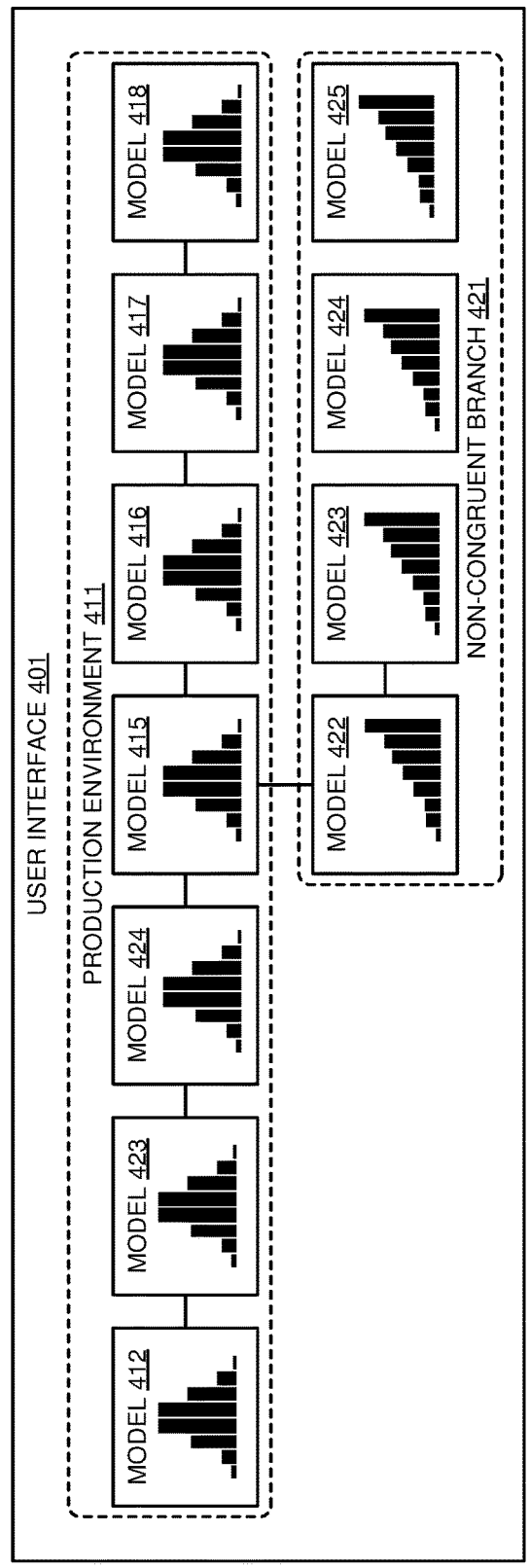
FIG. 4 illustrates an exemplary user interface.

FIG. 4 illustrates environment 400 which comprises user interface 401. User interface 401 is an example of user interface 433, although user interface 433 may differ. User interface 401 comprises production environment 411 and non-congruent branch 421. Production environment 411 comprises data stream models 412-418 and non-congruent branch 421 comprises branch data stream models 422-424. Non-congruent branch 421 is appended to production environment 411 at model 415. For example, a code change may have been made to branched data stream of a data pipeline and models 422-425 were generated to test the code change. In this example, the data stream represented by models 415-418 corresponds to the branch data stream represented by models 422-425 respectively (i.e., model 418 corresponds to model 425 and so on). Additionally, models 422-425 of non-congruent branch 421 are not congruent with corresponding ones of models 415-418. This indicates that the shape, volume, field, schemas, value ranges, and the like of branch models 422-425 do not align with corresponding ones of models 415-418. For example, the similarity threshold may comprise a minimum statistical distance (e.g., a geometric distance) between probability distributions for corresponding ones of data stream models 412-418 and branch data stream models 422-425. When the statistical distance between a branch model and a data stream model does not exceed the similarity threshold, the branch model is considered non-congruent with the data stream model. When the models are not congruent, this may indicate the code change to the data stream of the data pipeline did not have a desired effect. In this case, the code change may be marked as unsuccessful, and an alert may be generated to indicate the code change failed so that the code is not pushed to production. However, if the models are not congruent but the modeled behavior was expected and desired, a notification may be generated to indicate the code change was successful. In other examples, user interface 401 may comprise additional features not illustrated in FIG. 4 like options to view test results, options to create branches, options to search for data models, and the like. However, these additional options have been omitted for the sake of clarity.

Figure 5:
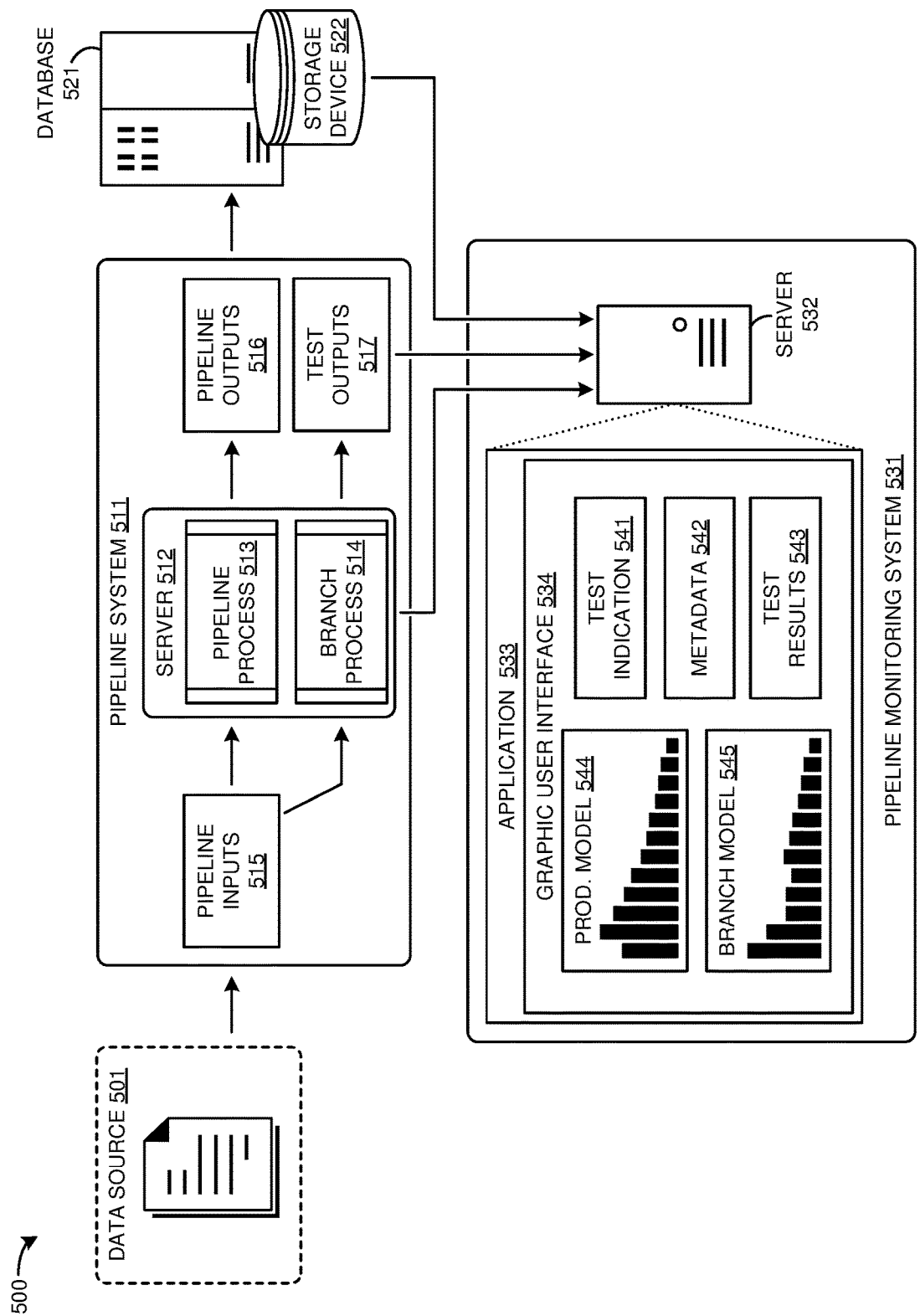
FIG. 5 illustrates an exemplary data processing environment.

FIG. 5 illustrates data processing environment 500 to branch data models. Data processing environment 500 is an example of data processing environment 100, however data processing environment 100 may differ. Data processing environment 500 comprises data source 501, pipeline system 511, database 521, and pipeline monitoring system 531. Pipeline system 511 comprises server 512, pipeline process 513, branch process 514 pipeline inputs 515, pipeline outputs 516, and test outputs 517. Database 521 comprises storage device 522. Pipeline monitoring system 531 comprises server 532, application 533, Graphic User Interface (GUI) 534. Application 533 is displayed on GUI 534 and comprises test indication 541, metadata 542, test results 543, production model 544, and branch models 545. In other examples, data processing environment 500 may include fewer or additional components than those illustrated in FIG. 5. Likewise, the illustrated components of data processing environment 500 may include fewer or additional components, assets, or connections than shown. Each of data source 501, pipeline system 511, database 521, and/or pipeline monitoring system 531 may be representative of a single computing apparatus or multiple computing apparatuses.

Data source 501 is representative of one or more computing devices configured to generate input data configured for ingestion by pipeline system 511. Data source 501 may produce industrial data, financial data, scientific data, machine learning data, and/or other types of input data for consumption by data pipeline system 511. Typically, the input data generated by data source 501 is not-suitable for end user consumption (e.g., storage in database 521) and requires data processing by pipeline system 511. It should be appreciated that the types of data sources that comprise data source 501 and the input data generated by data source 501 are not limited. Data source 501 transfers the input data to pipeline system 511 as pipeline inputs 515.

Pipeline system 511 is representative of an Extract Transform Load (ETL) environment that comprises data processing devices configured to receive and process input data from data source 501 and generate output data for end user consumption. Pipeline system 511 comprises one or more computing devices integrated into a network that communicates with data source 501 and database 521, and pipeline monitoring system 531. Examples of pipeline system 511 may include server computers and data storage devices deployed on-premises, in the cloud, in a hybrid cloud, or elsewhere, by service providers such as enterprises, organizations, individuals, and the like. Pipeline system 511 may rely on the physical connections provided by one or more other network providers such as transit network providers, Internet backbone providers, and the like to communicate with data source 501, database 521, and/or pipeline monitoring system 531.

Pipeline system 511 comprises server computer 512 which hosts pipeline process 513 and branch process 514. Server computer 512 comprises processors, bus circuitry, storage devices, software, and the like configured to host pipeline process 513. The processors may comprise CPUs, GPUs, ASICs, FPGAs, and the like. The storage devices comprise flash circuitry, RAM, HDDs, SSDs, NVMe SSDs, and the like. The storage devices store the software (e.g., pipeline process 513 and branch process 514). The processors may retrieve and execute software stored on the storage devices to drive the operation of pipeline system 511.

Pipeline process 513 comprises a series of data processing steps configured to transform pipeline inputs 515 into pipeline outputs 516. The processing steps may be implemented by a series of computing devices configured to algorithmically generate pipeline outputs 516 from inputs 515. The data processing algorithms employed by the computing devices may comprise one or more transform functions arranged in series and configured to operate on pipeline inputs 515. For example, inputs 515 may comprise a known format (e.g., schema) and the transform functions may be configured to operate on the known data format of inputs 515. The transform functions may be executed by the processors of server 512 on pipeline inputs 515 and responsively generate pipeline outputs 516. Pipeline process 513 may comprise a data cleaning process that transforms pipeline inputs 515 into pipeline outputs 516 suitable for storage in database 521. The cleaning process may comprise reformatting, redundancy removal, error correction, or some other type of operation to standardize pipeline inputs 515. It should be appreciated that pipeline process 513 is exemplary and the specific data processing operations implemented by pipeline process 513 are not limited.

Branch process 514 comprises another series of data processing steps similar to pipeline process 513 but incorporates a proposed code change to pipeline process 513. Typically, pipeline operators will create code branches to test updates, bug fixes, increase functionality, or other types of code changes to the main pipeline process to ensure the code changes are effective and do not negatively affect outputs generated by the pipeline process. For example, the code change may result in additional data fields in pipeline outputs to account for an upcoming format change in pipeline inputs 515. Branch process 514 ingests pipeline inputs 515 and executes a series of processing steps that incorporate the proposed code change to generate test outputs 517. The processing steps of branch process 514 may be implemented by a series of computing devices configured to algorithmically generate test outputs 516 from inputs 515. It should be appreciated that pipeline process 513 is exemplary and the specific data processing operations implemented by pipeline process 513 are not limited.

In some examples, pipeline process 513 may comprise a machine learning model where pipeline inputs 515 represent machine learning inputs and pipeline outputs 516 represent machine learning outputs. The machine learning model may comprise one or more machine learning algorithms trained to implement a desired process. Some examples of machine learning algorithms include artificial neural networks, nearest neighbor methods, ensemble random forests, support vector machines, naïve Bayes methods, linear regressions, or other types of machine learning algorithms that predict output data based on input data. In this example, pipeline inputs 515 may comprise feature vectors configured for ingestion by one or more machine learning algorithms and pipeline outputs 516 may comprise machine learning decisions.

Database 521 comprises storage device 522 and is representative of a data target for pipeline process 513. Database 521 comprises processors, bus circuitry, storage devices (including storage device 522), software, and the like configured to store output data sets 523-525. The processors may comprise CPUs, GPUs, ASICs, FPGAs, and the like. The storage devices comprise flash drives, RAM, HDDs, SSDs, NVMe SSDs, and the like. The processors may retrieve and execute software stored upon the storage devices to drive the operation of database 521. Database 521 receives and stores pipeline outputs 516 from pipeline process 513 on storage device 522. In some examples, database 521 additionally receives and stores test outputs 517 from pipeline system 511 on storage device 522. Storage device 522 may implement a data structure that categorizes and organizes pipeline outputs 516 according to a data storage scheme. For example, the received outputs may be organized by data type, size, point of origin, date of generation, and/or any other suitable data storage scheme. Database 521 may comprise user interface systems like displays, keyboards, touchscreens, and the like that allows a human operator to view and interact with the pipeline outputs stored upon storage device 522. The user interface systems may allow a human operator to review, select, and transfer stored pipeline outputs to pipeline monitoring system 531.

Pipeline monitoring system 531 is representative of a computing system integrated into a network configured to monitor the operation of pipeline system 511. Pipeline monitoring system 531 comprises server computer 532. Server computer 532 comprises one or more computing devices configured to host application 533. Server 532 is communicatively coupled to server 512 and database 521. The one or more computing devices that comprise server 532 comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software (e.g., application 533). The processors may retrieve and execute software stored on the storage devices to drive the operation of monitoring system 531.

Application 533 is representative of one or more pipeline monitoring applications, training applications, user interface applications, operating systems, modules, and the like. Application 533 is an example of application 134, application 134 may differ. Application 533 is configured to ingest and model outputs generated by pipeline system 511 to monitor the operations of pipeline system 511 based on the modeled data. Application 533 comprises test indication 541, metadata 542, and test results 543. Application 533 models pipeline process 513 as production (PROD.) model 544 based on pipeline output 516 and models branch process 514 as branch model 545 based on test outputs 517.

Server 532 comprises user interface systems like a display, mobile device, a touchscreen device, or some other type of computing device capable of performing the user interface functions described herein. Server 532 displays GUI 534 its user interface systems to facilitate user interaction with application 533. A user may interact with application 533 via GUI 534 to generate, view, and interact with models 544 and 545, test indication 541, metadata 542, and test results 543. GUI 534 provides a visual representation of models 544 and 545, test indication 541, metadata 542, and test results 543. In other examples, the graphical representation may include additional or different types of visual indicators relevant to testing branch process 514 and to the operation and status of pipeline system 511.

Test indication 541 comprises a notification received from pipeline system 511 that branch process 514 has been launched. For example, a pipeline operator may drive server 512 to transfer a notification to server indicating the creation of branch process 514 and application 533 may display the notification on GUI 534 as test indication 541. Metadata 542 characterizes one or more expected data attributes for test outputs 517. For example, application 533 may receive metadata 542 from pipeline system 511 and metadata 542 may comprise information like expected data volume, field names, schema, average value, median value, value distribution, and the like for test outputs 517. Application 533 compares branch model 545 to production model 544 and to metadata 542 to generate test results 543. Test results 545 comprise a notification that indicates whether branch model 545 comprises expected behavior indicated by the metadata. Test results 543 may comprise visual and/or textual information. For example, test results may comprise a table that indicates whether branch model 545 comprises the data volume, field names, schema, average value, median value, value distribution and/or other data attributes expected by metadata 542.

Production model 544 comprises a visual representation of pipeline outputs 516 received from server 512 and/or database 521. Application 533 processes pipeline outputs 516 to extract data attributes like value distribution, null value rates, zero value rates, schema, counts, hierarchy, date of generation, data volume, data types, and the like. Application 533 generates production model 544 based on the extracted data attributes. In this example, production model 544 comprises a set of histograms ordered by date that categorize various attributes of the pipeline output to depict the operation of pipeline process 513 over time. However, in other examples the visual representations may comprise probability distributions, data volumes, lineage charts, or other types of visual representations to characterize pipeline outputs received from server 512. The histograms may characterize data value distribution, null value rates, zero value rates, and the like. Likewise, branch model 545 comprises a visual representation of a test outputs 516 received from server 512 and/or database 521. In this example, branch model 545 comprises a histogram that categorizes various attributes of the outputs generated by branch process 514. However, in other examples the visual representations may comprise probability distributions, data volumes, lineage charts, or other types of visual representations to characterize test outputs received from server 512. The histograms may characterize data value distribution, null value rates, zero value rates, and the like. Typically, branch model 545 comprises the same type of visual representation as production model 544 to allow for efficient and effective comparisons between pipeline process 513 and branch process 514.

Application 533 appends branch model 545 to production model 544 at a point in time that corresponds to when branch process 514 was implemented. Production model 544 models pipeline outputs 516 over time to illustrate how outputs 516 change over each day of operation for pipeline process 513. For example, a first histogram of production model 544 may depict a first day of operation of process 513, a second histogram of production model 544 may depict a second day of operation of process 513, and so on. Branch model 545 is appended to one of the histograms of production model 544 that comprises the date of operation for process 513 when branch process 514 was instantiated. In doing so, an application 533 may compare branch model 545 to production model 544 over a corresponding operational time period. Application 533 may utilize a reference pointer to append branch model 545 to production model 544 marking the relationship between the branch and production models.

Figure 6:
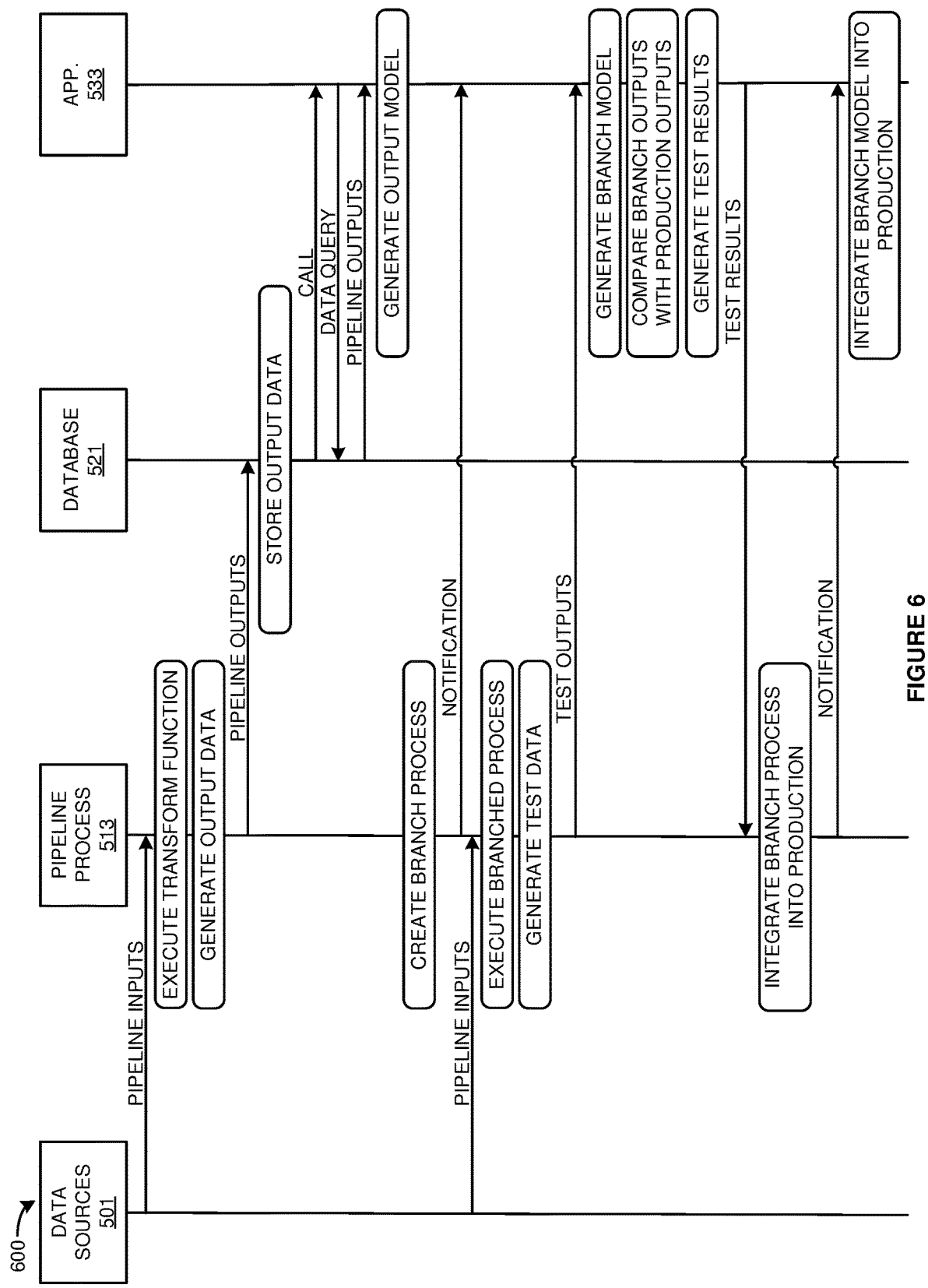
FIG. 6 illustrates an exemplary operation of the data processing environment.

FIG. 6 illustrates an exemplary operation of data processing environment 500 branch data models. The operation depicted by Figured 5 comprises an example of process 200 illustrated in FIG. 2, however process 200 may differ. In other examples, the structure and operation of data processing environment 500 may be different.

In operation, data source 501 transfer unprocessed data to pipeline system 511. For example, data source 501 may generate user subscription data and transfer the user subscription data to pipeline system 511 for processing. Pipeline system 511 receives the unprocessed data as pipeline inputs 515. Server 512 ingests pipeline inputs 515 and implements pipeline process 513. Pipeline process 513 cleans, transforms, applies a schema, or otherwise processes pipeline inputs 515 into a consumable form to generate pipeline outputs 516. Pipeline process 513 generates pipeline outputs 516 and drives transceiver circuitry in server 512 to transfer outputs 516 for delivery to database 521. Server 512 transfers pipeline outputs 516 for delivery to database 521. Database 521 receives pipeline outputs 516, stores the output data in storage device 522, and tracks the date of generation for the received output sets. Database 521 maintains a replica data set of outputs 516 to supply to monitoring system 531 for processing. For example, upon reception of outputs 516, database 521 may copy outputs 516 and store the copied outputs in a replica storage node on device 522.

Database 521 calls an API of server 532 to ingest outputs 516. Server 532 accepts the call and database 521 transfers the copied pipeline outputs for delivery to server 532. Application 533 receives the pipeline outputs and processes the outputs to determine data types, data value distributions, data schemas, null value rates, zero value rates, counts, hierarchy, date of generation, and data volume for the pipeline outputs. Application 533 models the pipeline outputs based on the extracted attributes and generates production model 544 using the models. For example, application 533 may generate histograms based on data value distributions of pipeline outputs 516 to model the outputs and create production model 544 using the histograms. Application 533 and database 521 may repeat the above process over time as pipeline process 513 generates and transfers additional pipeline outputs. Application 533 extracts the data attributes for the additional pipeline outputs and models the additional pipeline outputs. Application 533 adds the models for the additional pipeline outputs to production model 544 in order of date of generation. In doing so, application 533 models the operation of pipeline process 513 over time. For example, application 533 may read date fields for the pipeline outputs received from database 521 and model the pipeline outputs in order of date.

Subsequently, a pipeline operator generates branch process 514 to test a code change to pipeline process 514 before pushing the code change into production. In this example, the code change comprises an update that increases the number of data fields present in outputs generated by pipeline process 513. The pipeline operator instantiates branch process 514 on pipeline system 511 and directs server 512 to transfer a notification for delivery to application 533. The notification indicates the instantiation of branch process 514 (e.g., test indication 541), the date of instantiation, and metadata (e.g., metadata 542) that characterizes expected changes in the pipeline outputs introduced by the code change. In this example, the metadata indicates the additional output data fields that should be present as a result of the code change.

Data source 501 transfers additional unprocessed data to pipeline system 511. Pipeline system 511 receives the unprocessed data as pipeline inputs 515. Server 512 ingests and copies pipeline inputs 515. Server 512 implements branch process 514 using the copied pipeline inputs. Branch process 514 cleans, transforms, applies a schema, or otherwise processes pipeline inputs 515 into to test outputs 517. Branch process 514 drives transceiver circuitry in server 512 to transfer test outputs 517 for delivery to server 532 in monitoring system 531. The transceiver circuitry in server 512 transfers test outputs 517 for delivery to server 532.

In some examples, branch process 514 drives transceiver circuitry in server 512 to transfer test outputs 517 for delivery to database 521. Database 521 receives test outputs 517, stores test outputs 517 in storage device 522, and tracks the date of generation for the received test outputs. Database 521 maintains a replica data set of test outputs 517 to supply to monitoring system 531 for processing. Database 521 may then call an API of server 532 to ingest test outputs 517. Server 532 accepts the call and database 521 transfers the copied test outputs for delivery to server 532.

Returning to the operation, application 533 receives test outputs 517 and processes the test outputs to determine data types, data value distributions, data schemas, null value rates, zero value rates, counts, hierarchy, date of generation, and data volume for the test outputs. Application 533 models the test outputs based on the extracted attributes and generates branch model 545 using the models. Application 533 appends branch model 545 to production model 544 at the histogram that corresponds to the instantiation date of branch process 514. Application 533 utilizes a reference pointer to create this relationship. Application 533 and database 521 may repeat the above process over time as pipeline process 513 generates and transfers additional test outputs. Application 533 extracts the data attributes for the additional test outputs and models the additional test outputs. Application 533 adds the models for the additional test outputs to branch model 544 in order of date of generation. In doing so, application 533 models the operation of branch process 513 over time. Moreover, by appending branch model 545 to production model 544, application 533 may compare the operations of branch process 514 to pipeline process 513 over a corresponding time period.

Application 533 compares branch model 545 to the metadata received from pipeline system 511 to determine if the expected attributes indicated by the metadata are present in branch model 545. In particular, application 533 determines if the additional data fields introduced by the code change are present in the test outputs. Application 533 additionally compares branch model 545 to production model 544 to determine if branch outputs 517 exceed a similarity threshold with pipeline outputs 516. For example, application 533 may determine the geometric distance between the data value distribution, null value rates, zero value rates, schema, counts, hierarchy, date of generation, data volume, data types, and/or other statistical outputs of test outputs 517 and corresponding statistical attributes of pipeline outputs 516. Application 533 generates test results 543 based on the comparison and drives transceiver circuitry in server 532 to transfer test results 543 for delivery to server 512. Server 512 receives the test results. If the pipeline operator determines the test results to be successful, branch process 514 may be integrated into pipeline process 513 to push the code change into production. When pushed to production, server 512 notifies application 533 of the code integration. Application 533 updates production model 544 to reflect the code change. For example, application may mark the additional fields present in the pipeline outputs as a result of the code change as normal. In some examples application 533 forgoes transfer test results to pipeline process 513.

Figure 7:
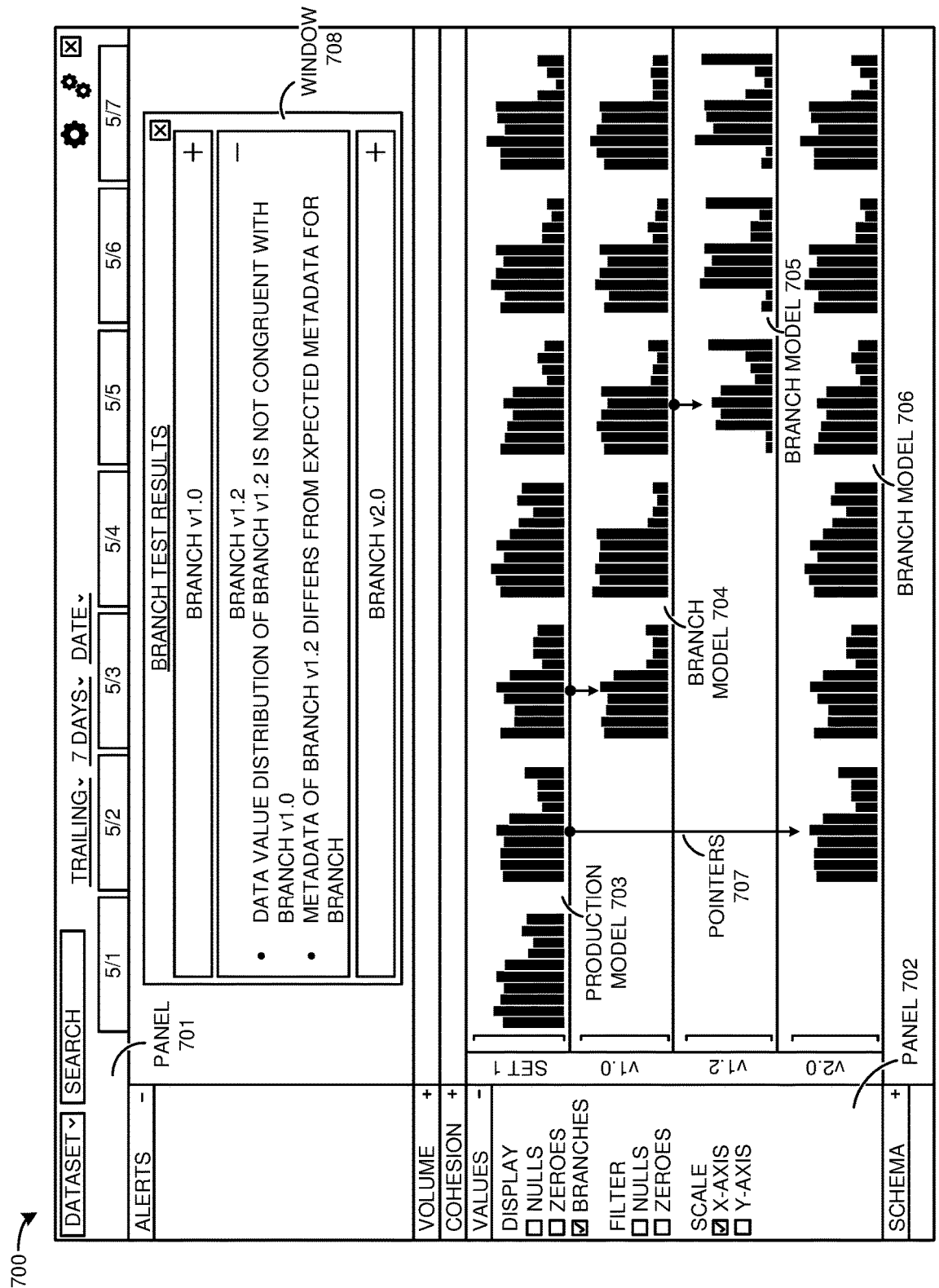
FIG. 7 illustrates an exemplary user interface.

FIG. 7 illustrates user interface 700 to branch data models. User interface 700 comprises an example of user interface 133 and user interface 334, however user interface 133 and user interface 334 may differ. User interface 700 comprises a pipeline monitoring application presented on a display screen which is representative of any user interface for indicating when errors occur in a data pipeline. User interface 700 comprises a GUI configured to allow a user to view operational metrics for a data pipeline like data volume and data shape and to receive notifications regarding detected errors in the operations of the data pipeline. The GUI provides visualizations for how data set volume, data set values, data set zero values, data set null values, and/or other data attributes change over time. In this example, the GUI presents branched models appended to a main production model to compare the operation of code branches of a data pipeline with the operation of the main production environment.

User interface 700 includes panel 701. Panel 701 is representative of a navigation panel and comprises tabs like "dataset" and "search" that allows a user to find and import data sets into user interface 700. For example, a user may interact with the "dataset" tab to import a data set from a data storage system that receives the outputs of the pipeline. Panel 701 also includes date range options to select data sets a data set from a period of time. In this example, a user has selected to view a data set over a week ranging from May $1^{st}$ to May $7^{th}$ labeled as May 1-May 7 in user interface 700. In other examples, a user may select a different date range and/or a different number of days.

User interface 700 includes panel 702. Panel 702 comprises tabs labeled alerts, volume, cohesion, values, and schema. In other examples, panel 702 may comprise different tabs than illustrated in FIG. 7. When a user selects one of the tabs, the tab expands to reveal its contents. In this example, a user has opened the values tab and the alerts tab. The values tab and the comprises production models 703, branch models 704-706, and pointers 707. The alerts tab comprises window 708. The values tab also includes display options to modify the view of outputs 703. The display options include toggles labeled nulls, zeroes, branches, zeroes or nulls, x-axis, and y-axis. In other examples, the display options may differ.

User interface 700 includes production models 703. Production models 703 comprises histogram visualizations, bar graph visualizations, and/or other types of visualizations of data sets imported into user interface 700 that characterize the main line operation of a data pipeline. Each data set of models 703-706 corresponds to the date selected by a user in panel 701. For example, the data sets of production models 703 are presented as a row with each one of the sets corresponding to the dates presented in panel 701. Production model 703 allows a user to view the shape, value distribution, size, and/or other attributes of pipeline outputs to infer the operation of the data pipeline over time. Production models 703 comprise histograms that characterize the value distributions for the data fields that pipeline outputs. In other examples, production models 703 may model the data sets differently than those illustrated in FIG. 7.

Branch models 704-706 comprise histogram visualizations, bar graph visualizations, and/or other types of visualizations of test data sets imported into user interface 700 that characterize the branched operations of a data pipeline. In particular, branch models 704-706 depict the effects of proposed code changes to the main line pipeline operations and/or alternative modelling schemes for production model 703. Branch models 704-706 are appended to other models via pointers 707. Branch model 704 is appended to production models 703 at the 5/3 data set. Branch model 705 is appended to branch model 704 at the 5/5 data set. Branch model 706 is appended to production model 703 at the 5/2 data set. Branch models 704-706 are appended at dates that correspond to the instantiation of their corresponding code branch. For example, branch model 704 depicts the test outputs of a code branch instantiated on 5/3 and is therefore appended to production model 703 at the 5/3 data set to allow a user to visually compare the effects of a code change with pipeline outputs generated over the same time period. Although user interface 700 is illustrated using pointers to show the relation between branch models and production models, other indicators may be used like colored highlights, shading, or other types of visual cues. For example, a user may select branch model 706 and user interface 700 may highlight the 5/2 data set of production models 703 to illustrate the appended relationship.

User interface 700 includes window 708. Window 708 is representative of test results to notify a user about comparison results between branch models 704-706 and production model 703. Window 708 comprises dropdown options labeled branch v1.0, branch v1.2, and branch v2.0 which correspond to branch model 704-706. A user may select the dropdown option to reveal its contents. In this example, a user has selected the dropdown option that correspond to branch model 705 which comprises text-based information indicating the branch is not congruent with the branch it is appended to and that the measured metadata differs from the expected metadata for the branch. In other examples, window 708 may differ. For example, window 708 may comprise animations to indicate the test results.

Figure 8:
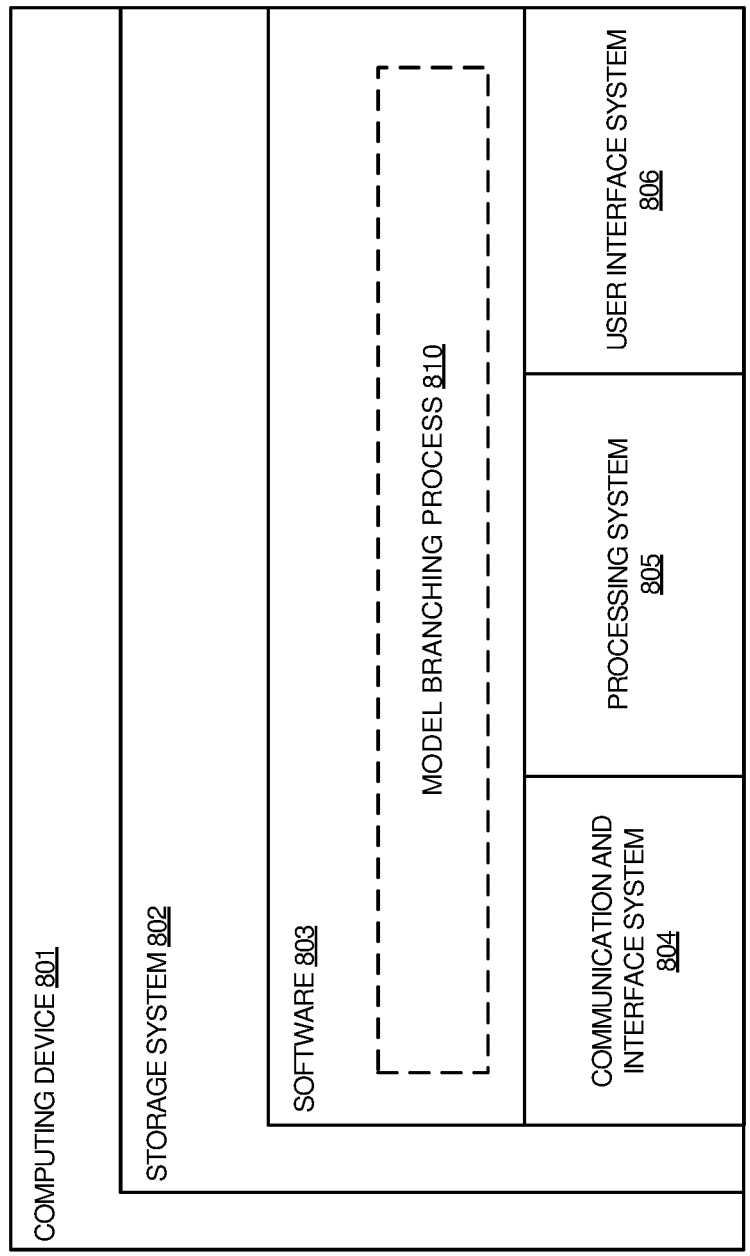
FIG. 8 illustrates an exemplary computing device that may be used in accordance with some embodiments of the present technology.

FIG. 8 illustrates environment 800 which comprises computing device 801. Computing device 801 is representative of any system or collection of systems in which the various processes, programs, services, and scenarios disclosed herein for testing data pipeline code may be implemented. For example, computing device 801 may be representative of data pipeline system 111, data target 121, computing device 132, user interface 133, user interface 300, user interface 400, server 512, server 532, and/or database 521. Examples of computing system 100 include, but are not limited to, server computers, routers, web servers, cloud computing platforms, and data center equipment, as well as any other type of physical or virtual server machine, physical or virtual router, container, and any variation or combination thereof.

Computing system 801 may be implemented as a single apparatus, system, or device or may be implemented in a distributed manner as multiple apparatuses, systems, or devices. Computing system 801 includes, but is not limited to, storage system 802, software 803, communication and interface system 804, processing system 805, and user interface system 806. Processing system 805 is operatively coupled with storage system 802, communication interface system 804, and user interface system 806.

Processing system 805 loads and executes software 803 from storage system 802. Software 803 includes and implements model branching process 810, which is representative of the branching processes discussed with respect to the preceding Figures. For example, process 810 may be representative of process 200 illustrated in FIG. 2. When executed by processing system 805, software 803 directs processing system 805 to operate as described herein for at least the various processes, operational scenarios, and sequences discussed in the foregoing implementations. Computing system 801 may optionally include additional devices, features, or functionality not discussed here for purposes of brevity.

Processing system 805 may comprise a micro-processor and other circuitry that retrieves and executes software 803 from storage system 802. Processing system 805 may be implemented within a single processing device but may also be distributed across multiple processing devices or sub-systems that cooperate in executing program instructions. Examples of processing system 805 include general purpose central processing units, graphical processing units, application specific processors, and logic devices, as well as any other type of processing device, combinations, or variations thereof.

Storage system 802 may comprise any computer readable storage media that is readable by processing system 805 and capable of storing software 803. Storage system 802 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 802 may also include computer readable communication media over which at least some of software 803 may be communicated internally or externally. Storage system 802 may be implemented as a single storage device but may also be implemented across multiple storage devices or sub-systems co-located or distributed relative to each other. Storage system 802 may comprise additional elements, such as a controller, capable of communicating with processing system 805 or possibly other systems.

Software 803 (model branching process 810) may be implemented in program instructions and among other functions may, when executed by processing system 805, direct processing system 805 to operate as described with respect to the various operational scenarios, sequences, and processes illustrated herein. For example, software 803 may include program instructions for implementing a data pipeline model branching process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 803 may include additional processes, programs, or components, such as operating system software, virtualization software, or other application software. Software 803 may also comprise firmware or some other form of machine-readable processing instructions executable by processing system 805.

In general, software 803 may, when loaded into processing system 805 and executed, transform a suitable apparatus, system, or device (of which computing system 801 is representative) overall from a general-purpose computing system into a special-purpose computing system customized to test software changes to a data pipeline as described herein. Indeed, encoding software 803 on storage system 802 may transform the physical structure of storage system 802. The specific transformation of the physical structure may depend on various factors in different implementations of this description. Examples of such factors may include, but are not limited to, the technology used to implement the storage media of storage system 802 and whether the computer-storage media are characterized as primary or secondary storage, as well as other factors.

For example, if the computer readable storage media are implemented as semiconductor-based memory, software 803 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 804 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples provided herein are described in the context of a data pipeline monitoring computing device, it should be understood that the condition systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A data monitoring system to branch data models, the system comprising:
a memory that stores executable components; and
a processor, operatively coupled to the memory, that executes the executable components, the executable components comprising:
a monitoring component that:
obtains a data stream from a data pipeline system, wherein the data pipeline system ingests input data, processes the input data using a production environment to generate output data, and produces the data stream that comprises the output data;
generates a series of models to characterize the data stream;
obtains a notification from that data pipeline system of a code branch in the data pipeline system, wherein the data pipeline system processes the input data using the code branch to generate test output data, and produces a test data stream that comprises the test output data;
adds a reference pointer to a position in the series of models that corresponds to the code branch;
generates a set of branch models to characterize the test data stream and appends the set of branch models to the series of models at the reference pointer;
compares ones of the set of branch models with corresponding ones of the series of models and generates test results based on the comparison; and
reports the test results to the data pipeline system, wherein the data pipeline system merges the code branch to the production environment based on the test results.

2. The data monitoring system of claim 1 wherein the monitoring component further:
receives metadata and associates the metadata with the code branch in the data pipeline; and
identifies the code branch is merged with a production environment of the data pipeline based on the metadata.

3. The data monitoring system of claim 1 wherein the monitoring component further:
generates production metadata characterizing the series of models;
generates branch metadata characterizing the set of branch models;
compares the production metadata with the branch metadata and determines the production metadata does not exceed a similarity threshold with the branch metadata; and
generates an alert when the production metadata does not exceed the similarity threshold with the branch metadata.

4. The data monitoring system of claim 1 wherein the monitoring component further:
generates production metadata characterizing the series of models;
generates branch metadata characterizing the set of branch models;
compares the production metadata with the branch metadata and determines the production metadata exceeds a similarity threshold with the branch metadata; and
generates the test results that indicate the production metadata exceeds the similarity threshold with the branch metadata.

5. The data monitoring system of claim 1 wherein the monitoring component further:
generates branch metadata characterizing the set of branch models;
receives a data standard indicating expected behavior for the set of branch models;
compares the expected behavior with the branch metadata and determines the expected behavior exceeds a similarity threshold with the branch metadata; and
generates the test results that indicate the expected behavior exceeds the similarity threshold with the branch metadata.

6. The data monitoring system of claim 1 wherein the monitoring component further:
deactivates the series of models and maintains the set of branch models to model the data stream based on the comparison.

7. The data monitoring system of claim 1 wherein the monitoring component further:
maintains the set of branch models;
adds another reference pointer to a branch model of the set of branch models;
generates another set of branch models for the data stream and appends the other set of branch models to the set of branch models at the other reference pointer;
compares ones of the other set of branch models with corresponding ones of the set of branch models and responsively generates additional test results; and
reports the additional test results.

8. The data monitoring system of claim 1 wherein the test results comprise at least one of a pass marking or a failure marking for the set of branch models.

9. A method of operating a data monitoring system to branch data models, the method comprising:
obtaining a data stream from a data pipeline system, wherein the data pipeline system ingests input data, processes the input data using a production environment to generate output data, and produces the data stream that comprises the output data;
maintaining generating a series of models to characterize the data stream;
obtaining a notification from that data pipeline system of a code branch in the data pipeline system, wherein the data pipeline system processes the input data using the code branch to generate test output data, and produces a test data stream that comprises the test output data;
adding a reference pointer to a position in the series of models that corresponds to the code branch;
generating a set of branch models to characterize the test data stream and appending the set of branch models to the series of models at the reference pointer;

comparing ones of the set of branch models with corresponding ones of the series of models and generating test results based on the comparison; and reporting the test results to the data pipeline system, wherein the data pipeline system merges the code branch to the production environment based on the test results.

10. The method of claim 9 further comprising:

receiving metadata and associating the metadata with the code branch in the data pipeline; and identifying the code branch is merged with a production environment of the data pipeline based on the metadata.

11. The method of claim 9 further comprising:

generating production metadata characterizing the series of models;

generating branch metadata characterizing the set of branch models;

comparing the production metadata with the branch metadata and determining the production metadata does not exceed a similarity threshold with the branch metadata; and generating an alert when the production metadata does not exceed the similarity threshold with the branch metadata.

12. The method of claim 9 further comprising:

generating production metadata characterizing the series of models;

generating branch metadata characterizing the set of branch models;

comparing the production metadata with the branch metadata and determining the production metadata exceeds a similarity threshold with the branch metadata; and generating the test results that indicate the production metadata exceeds the similarity threshold with the branch metadata.

13. The method of claim 9 further comprising:

generating branch metadata characterizing the set of branch models;

receiving a data standard indicating expected behavior for the set of branch models;

comparing the expected behavior with the branch metadata and determines the expected behavior exceeds a similarity threshold with the branch metadata; and generating the test results that indicate the expected behavior exceeds the similarity threshold with the branch metadata.

14. The method of claim 9 further comprising:

deactivating the series of models and maintaining the set of branch models to model the data stream based on the comparison.

15. The method of claim 9 further comprising:

maintaining the set of branch models;

adding another reference pointer to a branch model of the set of branch models;

generating another set of branch models for the data stream and appending the other set of branch models to the set of branch models at the other reference pointer;

comparing ones of the other set of branch models with corresponding ones of the set of branch models and responsively generating additional test results; and reporting the additional test results.

16. The method of claim 9 wherein the test results comprise at least one of a pass marking or a failure marking for the set of branch models.

17. A non-transitory computer-readable medium storing instructions to branch data models, wherein the instructions, in response to execution by one or more processors, cause the one or more processors to drive a system to perform operations comprising:

obtaining a data stream from a data pipeline system, wherein the data pipeline system ingests input data, processes the input data using a production environment to generate output data, and produces the data stream that comprises the output data;

maintaining generating a series of models to characterize the data stream;

obtaining a notification from that data pipeline system of a code branch in the data pipeline system, wherein the data pipeline system processes the input data using the code branch to generate test output data, and produces a test data stream that comprises the test output data;

adding a reference pointer to a position in the series of models that corresponds to the code branch;

generating a set of branch models to characterize the test data stream and appending the set of branch models to the series of models at the reference pointer;

comparing ones of the set of branch models with corresponding ones of the series of models and generating test results based on the comparison; and reporting the test results to the data pipeline system, wherein the data pipeline system merges the code branch to the production environment based on the test results.

18. The non-transitory computer-readable medium of claim 17, the operations further comprising:

receiving metadata and associating the metadata with the code branch in the data pipeline; and identifying the code branch is merged with a production environment of the data pipeline based on the metadata.

19. The non-transitory computer-readable medium of claim 17, the operations further comprising:

generating production metadata characterizing the series of models;

generating branch metadata characterizing the set of branch models;

comparing the production metadata with the branch metadata and determining the production metadata does not exceed the similarity threshold with the branch metadata; and generating an alert when the production metadata does not exceed the similarity threshold with the branch metadata.

20. The non-transitory computer-readable medium of claim 17, the operations further comprising:

generating production metadata characterizing the series of models;

generating branch metadata characterizing the set of branch models;

comparing the production metadata with the branch metadata and determining the production metadata exceeds a similarity threshold with the branch metadata; and generating the test results that indicate the production metadata exceeds the similarity threshold with the branch metadata.

* * * * *